April 28, 1936.  R. L. LÉVY  2,038,944
AUTOMATICALLY ADJUSTABLE BRAKING SYSTEM
Filed Oct. 2, 1935
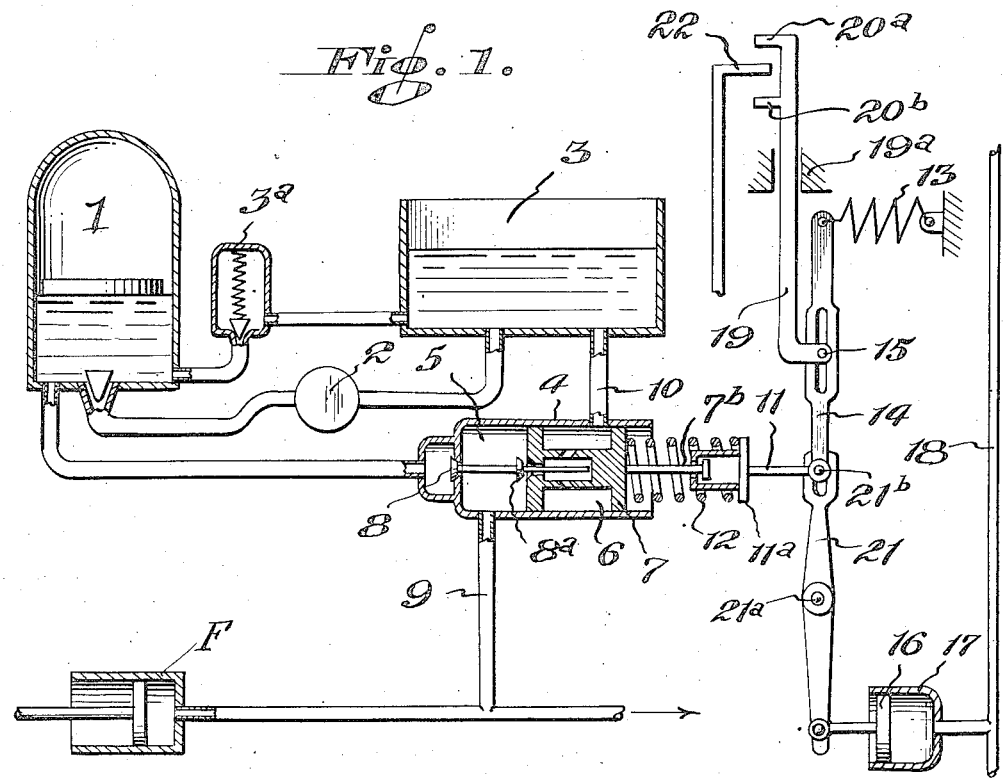
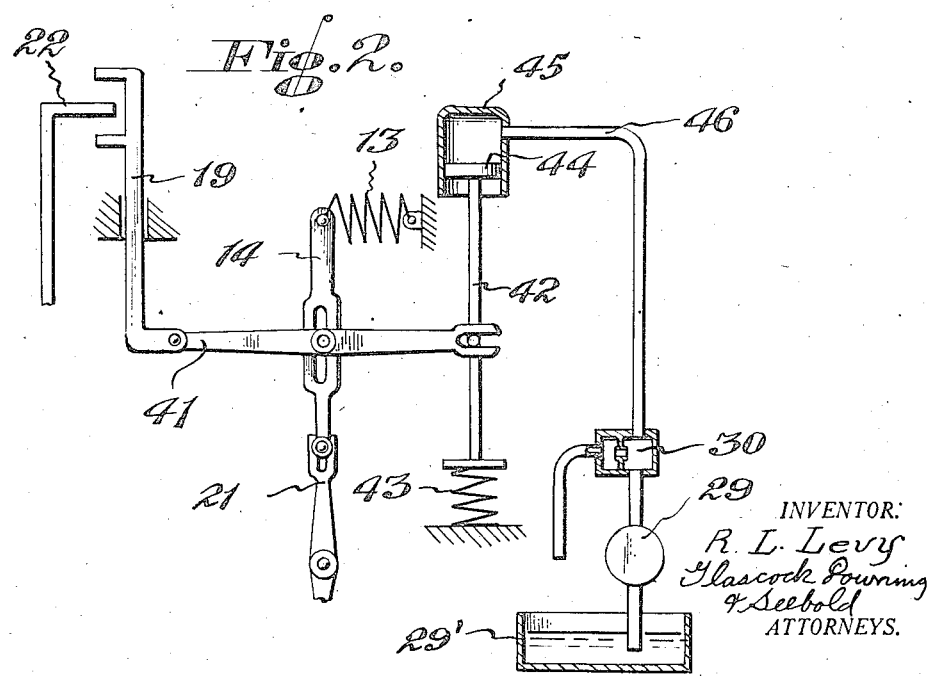

Patented Apr. 28, 1936

2,038,944

UNITED STATES PATENT OFFICE 2,038,944

AUTOMATICALLY ADJUSTABLE BRAKING SYSTEM

René Lucien Lévy, Montrouge, France, assignor to Société D'Inventions Aeronautiques et Mecaniques S. I. A. M., Fribourg, (Suisse)

Application October 2, 1935, Serial No. 43,255
In France September 28, 1934

5 Claims. (Cl. 303—10)

This invention relates to a braking system by fluid under pressure, applicable to a train of vehicles, and in which the braking stress is automatically controlled or limited according to the speed of the train and to the individual weight of the vehicles and can, moreover, be adapted to other circumstances, for instance to the momentary coefficient of adherence.

The system essentially comprises individual servo-braking stations in a number equal to that of the vehicles of the train, and a general control station, actuated by the driver and capable of producing, in a main pipe line passing throughout the train, the pressure the variation of which causes the operation of the individual stations, the whole of the various connections being so combined that if the main pipe line breaks, the maximum braking action is instantaneously exerted.

The individual stations each comprise a pressure fluid accumulator; this fluid can be sent in the pipe line supplying the brakes through the medium of a pressure reducer-distributor so devised that, when it is not subjected to any external action, the maximum pressure is exerted on the brakes. When, on the contrary, this pressure reducer-distributor is subjected to an external stress, arising, for instance, from the main pipe line, the pressure of the fluid it allows to pass to the brakes decreases in proportion as the stress arising from the main pipe line increases.

A mechanism actuated by the individual weight of the vehicles acts, either upon intervention of the stress transmitted by the main pipe line, or on the maximum pressure which can be exerted on the brakes by the distributor.

The main control station also comprises a pressure fluid accumulator and a pressure reducer-distributor allowing to send the fluid in the main control pipe line with a definite pressure. The distributor is so devised that without the intervention of the driver the maximum pressure is sent in the main pipe line, thus causing the release of the brakes. The action of the driver has the effect of varying the pressure in the main pipe line, this producing a braking action on the vehicles in function of the variation of pressure relatively to the maximum pressure.

The correction due to the speed of the train can be effected by causing a device actuated by the speed to intervene, either at the individual stations of vehicles, or at the main control station.

The correcting device or devices vary the pressure available for producing the braking action.

They also intervene as devices for limiting the braking action.

The load correction is always individually applied on each vehicle, whereas the other corrections, such as the correction of speed or the correction of adherence, can be applied either at the main station, or at the individual stations.

When several corrections are effected at one and the same station, the correcting devices can be entirely independent, or they can be grouped so as to produce on one and the same member the resultant of the correcting actions.

The accompanying figures illustrate, by way of example, the diagrammatic arrangement of a system embodying the features of the invention and in which the load correction is effected at the individual stations while the corrections of speed (automatic) and of adherence (positively effected), are executed at the main station with a limitative action.

Fig. 1 is a diagrammatic part sectional view of an individual servo-braking station.

Fig. 2 is a fragmentary view of a modification thereof.

Referring to Fig. 1, a tank I contains the reserve of fluid under pressure, for instance a liquid delivered by the pump 2 into the tank I forming a compressed air bell. A vessel 3 and a suitable system of valves 3ª complete the installation. The valve 3ª is adapted to allow the return of the liquid from tank I to the vessel 3 when the pressure in the tank exceeds a predetermined limit value. The pump 2 can be driven by one of the axles of the vehicle or in any other manner. The pressure reducer-distributor 4, similar to that described in the French patent dated October 12, 1933, in the name of the applicant, for: "Device for controlling the brakes of railway vehicles and other applications," comprises two chambers, one, 5, of which is permanently in communication with the brake cylinders F through a piping 9, whilst the other chamber 6 constantly communicates with the vessel 3 by a piping 10. A piston 7, on the one hand separates the chambers 5 and 6 and, on the other hand, closes chamber 6 to the exterior. A double valve 8—8ª ensures the communication of chamber 5 with tank I when the piston 7 moves towards the left, and allows the communication between chambers 5 and 6 when the piston moves towards the right. The actuation of the pressure reducer-distributor is effected through the medium of a device II which can push back a spring 12, the other end of which bears on the piston 7.

The piston 7 has on the end exposed to the open end of the cylinder 4, a rod 7ᵇ attached thereto. The device 11 comprises a rod pivoted at one end to levers to be described later, and at the other end carrying a disk 11ᵃ. A coil spring 12 is held between the disk 11ᵃ and the piston 7 and tends to press the piston to the left in Fig. 1. Thus, the device 11 governs the position of the piston 7.

From a main pressure reducer, not shown, a pipe 18 extends, communicating with which are open ended cylinders 17. In each of these a piston 16 moves. The rod of this piston 16 is pivoted to a lever 21 at one end thereof. Lever 21 is pivoted at a median point to a fixed element and the other end is pivoted on the same pivot 21ᵇ as is rod 11. Changes in the pressure in pipe 18 move the piston 16 and this motion is thus transmitted to piston 7.

A finger 22 rigidly connected with the axle extends into the space between the forks 20ᵃ and 20ᵇ of a slide rod 19 guided in a slide 19ᵃ fixed on the vehicle. One end of said slide rod has a pin 15 extending therefrom and upon this pin is pivoted a lever 14 at a median point of said lever 14. One end of said lever has a spring 13 attached thereto the other end of said spring being attached to a fixed point of the vehicle. The other end of said lever is pivoted at 21ᵇ. The load on the vehicle is transmitted through the rod 22, to change the position of the pivot 15 and hence the leverage of spring 13, thus affecting the position of the piston 7.

The operation of the above described device is as follows:

It will be understood that if the compression of the spring 12 increases, the piston moves towards the left until the quantity of liquid admitted from tank 1 into chamber 5 and in the brakes supplied by the pipe line 9 is sufficient for the pressure existing in chamber 5 to produce on piston 7 a stress balancing the compression of spring 12. If, on the contrary, the compression of spring 12 diminishes, the piston moves towards the right and allows the escape, towards the vessel 3, of the quantity of liquid necessary for restoring the pressure in chamber 5 to another value balancing the new value of the stress of spring 12.

The device 11 is subjected, on the other hand, to the action of the spring 13 which, through the medium of the lever 14 pivoted at 15, tends to push this device towards the regulator, the pressure of the spring 13 being determined in such a manner that in the absence of any other external intervention, the balancing pressure in chamber 5 is equal to a given value corresponding to the maximum possible braking action on the vehicle, in any circumstances.

The external intervention in order to actuate the distributor 4 and, consequently, the brakes, is obtained through the lever 21, pivoted at 21ᵃ, capable of acting at 21ᵇ on lever 14 and on which is exerted the stress produced by the piston 16 of cylinder 17 supplied by the main pipe line 18. Any pressure in the cylinder 17 impedes the action of spring 13 and, consequently, the action of spring 12 on piston 7, therefore diminishing the pressure in chamber 5 and in the braking pipe line 9. It is thus possible to vary at will the braking stress by variation of the pressure in pipe line 18, the maximum braking action being obtained when the pressure in the latter is null.

The arm 22 and fork 20ᵃ, 20ᵇ being relatively moved in accordance with the load of the vehicle transmit such movement to pivot 15, the effect of which is to vary the pressure on spring 12 and hence the position of the piston 7.

Thus, an individual correction of the braking action in function of the load is obtained.

In the modification shown in Fig. 2 an individual speed correction is effected. In this form of the device the pivot 15 of Fig. 1 in lieu of being directly attached to slide rod 19 is on a lever 41 one end of which is pivoted to said slide rod. A rod 42 is connected to the other end of lever 41 which rod is pressed upwardly by a spring 43 attached to a fixed part of the vehicle. A piston 44 forms the upper end of the rod 42 and moves in a cylinder 45 open at one end and communicating at the other with a source of pressure through conduit 46. In accordance with variations in said pressure the position of the pivot 15 will be altered. A pump 29 is driven by the movement of the vehicle to force water from a tank 29ᵃ through conduit 46. An enlargement of pipe 46, has a perforated diaphragm through which water may escape. The speed of the pump thus controls the pressure in the cylinder 45. Otherwise, this modification is similar to the one shown in Fig. 1.

The operation of this modification is obvious from the operation of the device shown in Fig. 1 as it merely adds a further controlling influence namely the speed of the vehicle.

The descriptions of the mechanisms which ensure the action of the elements generating the corrections are given by way of indication and not in a limiting sense, as numerous known devices are capable of producing the desired result.

The fluid employed can be a liquid or a gas; a liquid can be used in some parts of the system and a gas in other parts, according as one or the other will be more convenient in the conditions of utilization.

What I claim as my invention and desire to secure by Letters Patent is:

1. In a servo-braking device for a vehicle, a pressure tank, an open tank, a pipe connecting them and a pump interposed in said pipe, a brake cylinder, a pressure reducer-distributor comprising a cylinder, pipes communicating with said cylinder and respectively with said pressure tank, said open tank and the brake cylinder, a movable element in said cylinder controlling the communication between said cylinder and said pressure tank and said open tank respectively, a spring bearing against said movable element at one end, an actuating device for the movable element against which the other end of the spring bears, a lever, one end of which is pivoted to said actuating device, a slidable pivot engaging the middle portion of said lever, a second spring attached on the one hand to the other end of said lever and on the other to a fixed element, means moving said slidable pivot in accordance with the weight of the load.

2. The apparatus as claimed in claim 1 in which the means for moving said slidable pivot in accordance with the weight of the load comprises a sliding rod carrying said last named pivot at one end, a fork rigid with said rod at the other end, and an element rigid with the frame of the vehicle acting on said fork for causing the displacement of the pivot.

3. The apparatus as claimed in claim 1, in which a second lever is pivoted at one end to the actuating device and fixedly pivoted at the middle portion, a main braking pipe line and means for actuating said second lever from said main braking pipe line.

4. The apparatus as claimed in claim 1, in which the means for moving said slidable pivot in accordance with the weight of the load comprises a sliding rod carrying said last named pivot at one end, a fork rigid with said rod at the other end, and an element rigid with the frame of the vehicle acting on said fork for causing the displacement of the pivot, a second lever pivoted at one end to the actuating device and fixedly pivoted at the middle portion, a main braking pipe line and means for actuating said second lever from said main braking pipe line.

5. The apparatus as claimed in claim 1, in which there are also means for moving said slidable pivot in accordance with the speed of the vehicle.

RENÉ LUCIEN LÉVY.